(12) United States Patent
Kim et al.

(10) Patent No.: US 11,648,988 B2
(45) Date of Patent: May 16, 2023

(54) REAR STRUCTURE FOR VEHICLE

(71) Applicants: HYUNDAI MOTOR COMPANY, Seoul (KR); Kia Corporation, Seoul (KR)

(72) Inventors: Sung Hun Kim, Bucheon-si (KR); Ju Woong Park, Seongnam-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 85 days.

(21) Appl. No.: 17/407,794

(22) Filed: Aug. 20, 2021

(65) Prior Publication Data
US 2022/0204094 A1   Jun. 30, 2022

(30) Foreign Application Priority Data
Dec. 28, 2020  (KR) .......................... 10-2020-0184790

(51) Int. Cl.
| | | |
|---|---|---|
| *B60J 7/00* | (2006.01) | |
| *B62D 25/20* | (2006.01) | |
| *B62D 21/15* | (2006.01) | |
| *B62D 25/08* | (2006.01) | |

(52) U.S. Cl.
CPC ....... *B62D 25/2027* (2013.01); *B62D 21/152* (2013.01); *B62D 25/087* (2013.01)

(58) Field of Classification Search
CPC .............. B62D 25/2027; B62D 21/152; B62D 25/087; B62D 21/15; B62D 27/02; Y02T 10/62; Y02T 10/70; B60Y 2306/01; B60Y 2410/124
See application file for complete search history.

(56) References Cited

U.S. PATENT DOCUMENTS

| | | | |
|---|---|---|---|
| 2010/0072786 A1* | 3/2010 | Koyama ............ | B62D 25/2027 296/203.04 |
| 2016/0083011 A1* | 3/2016 | Kawaguchi ............ | B62D 21/08 296/203.01 |
| 2017/0073019 A1* | 3/2017 | Kabayama ......... | B62D 25/2027 |

FOREIGN PATENT DOCUMENTS

KR   10-2020-0094387 A   8/2020

* cited by examiner

*Primary Examiner* — Kiran B Patel
(74) *Attorney, Agent, or Firm* — Lempia Summerfield Katz LLC

(57) ABSTRACT

The rear structure for vehicles includes: a rear floor; and a pair of oblique members coupled to a lower surface of the rear floor and configured to be symmetrical with each other about a longitudinal centerline of the rear floor, each oblique member of the pair of oblique members extending from a first side and a second side, respectively, of the rear floor to a rear portion of the rear floor.

11 Claims, 7 Drawing Sheets

REAR STRUCTURE FOR VEHICLE

CROSS-REFERENCE TO RELATED APPLICATION

This application claims priority to and the benefit of Korean Patent Application No. 10-2020-0184790, filed on Dec. 28, 2020, the entire contents of which are incorporated herein by reference.

FIELD

The present disclosure relates to a rear structure for vehicles.

BACKGROUND

The statements in this section merely provide background information related to the present disclosure and may not constitute prior art.

A hybrid electric vehicle (HEV) is driven using both an engine and a motor. The motor drives the HEV by receiving electrical energy stored in a battery and power through regenerative braking or the like, and the engine drives the HEV when the amount of power stored in the battery drops to a certain level. The HEV is capable of being driven by continuously charging the battery through self-power generation and regenerative braking during driving. Thus, the HEV exhibits low fuel consumption and low emission of pollutants and is considered an eco-friendly vehicle.

A plug-in hybrid electric vehicle (PHEV), a kind of HEV, has a larger-capacity battery mounted compared to a conventional HEV. The PHEV is driven in a manner in which the battery of the PHEV is charged through an external electricity supply source, an electric motor is driven by the power of the battery, and then, when the power of the battery is exhausted, an engine is operated.

In these HEVs, both a fuel tank and a battery are mounted. The fuel tank and the battery must not only be installed in the limited space in the vehicle but must also be protected from an external impact in the event of a collision. Hence, the HEVs desire an appropriate protective structure and an appropriate layout design. In consideration of both aspects, the battery and the fuel tank together with a desired protective structure are mounted mainly on a rear floor of the body of the vehicle.

Figure 1A:
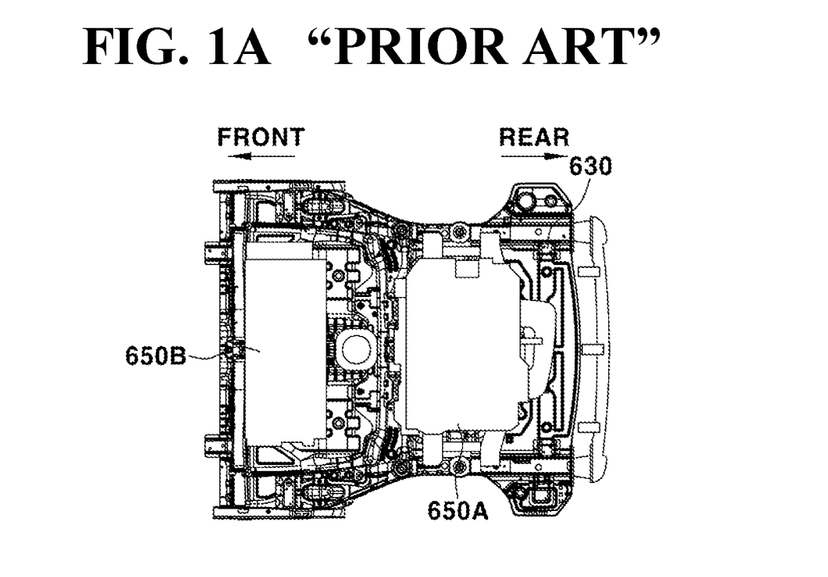
FIG. 1A is a top view of a rear floor of an exemplary hybrid electric vehicle.
Figure 1B:
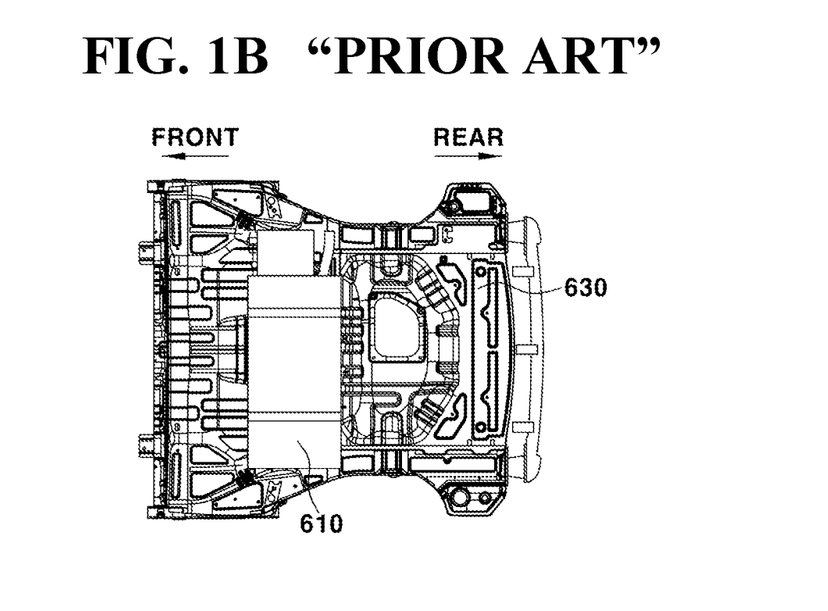
FIG. 1B is a bottom view of the rear floor of the exemplary hybrid electric vehicle.

For example, as shown in FIGS. 1A and 1B, batteries 650A and 650B are mounted on the upper surface of a rear floor 630, and a fuel tank 610 is mounted on the lower surface of the rear floor 630. In order to protect the fuel tank 610 when a vehicle collision occurs, the fuel tank 610 is disposed at a position spaced apart from the rear portion of the vehicle by a designated distance, and, in order to provide battery capacity, two separate batteries 650A and 650B are disposed.

An offset crash test, in which a vehicle is collided at a position offset from the longitudinal centerline of the vehicle, is commonly used to evaluate the ability of the vehicle to withstand a rear collision. Here, when a rear collision occurs, the back beam of the vehicle is deformed and fractured. Additional deformation is suppressed by a rear cross member. However, for example, when an offset collision occurs at the left side with respect to the centerline of the vehicle, the front end of a corresponding side member is bent. Also, impact distribution is insufficient due to the fracture of the back beam of the vehicle, so the right side member absorbs less collision force. The left side member is rotated inwards.

The above information disclosed in this Background section is only for enhancement of understanding of the background of the present disclosure and therefore it may contain information that does not form the prior art that is already known to a person of ordinary skill in the art.

SUMMARY

The present disclosure provides a rear structure for vehicles, which may effectively protect a fuel tank and a battery in the event of a rear collision.

In one aspect, the present disclosure provides a rear structure for vehicles, the rear structure including: a rear floor; and a pair of oblique members coupled to a lower surface of the rear floor and configured to be symmetrical with each other about a longitudinal centerline of the rear floor, each oblique member of the pair of oblique members extending from a first side and a second side, respectively, of the rear floor to a rear portion of the rear floor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, preferred forms of the present disclosure will be described in detail with reference to the accompanying drawings. Specific structures or functions described in the forms of the present disclosure are merely for illustrative purposes. Forms according to the concept of the present disclosure may be implemented in various forms, and it should be understood that they should not be construed as being limited to the forms described in the present specification, but include all of modifications, equivalents, or substitutes included in the spirit and scope of the present disclosure.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

The terminology used herein is for the purpose of describing particular forms only and is not intended to be limiting. As used herein, the singular forms "a," "an," and "the" are intended to include the plural forms as well, unless the context clearly indicates otherwise. It will be further understood that the terms "comprise," "include," "have," etc., when used in this specification, specify the presence of stated components, steps, operations, and/or elements, but do not preclude the presence or addition of one or more other components, steps, operations, and/or elements thereof.

The present disclosure provides a rear structure for vehicles, which imparts to a body of a hybrid electric vehicle (HEV), particularly a plug-in hybrid electric vehicle (PHEV), with excellent ability to withstand a rear collision.

A vehicle having the rear structure for vehicles according to the present disclosure includes a single high-voltage battery. The high-voltage battery also has an increased size due to the increased capacity thereof. In the present disclosure, in order to effectively dispose the battery having the increased size, a fuel tank may be disposed at the rear of the battery on the rear floor through the rear structure having excellent ability to withstand a collision.

The deformation rate of a fuel tank of a general internal combustion vehicle is allowed up to about 40%, whereas the deformation rate of a fuel tank of a plug-in hybrid electric vehicle (PHEV) is allowed up to only about 15% due to strict conditions thereon. Therefore, in the vehicle shown in FIGS. 1A and 1B, the fuel tank 610 is disposed at a position located relatively close to the front portion of the vehicle from the rear end of the vehicle. Thus, the two batteries 650A and 650B are separately mounted. Cooling of the batteries 650A and 650B is performed in an air-cooled manner due to the characteristics of these split-type batteries. In fact, the performance of air-cooled-type batteries is lower than that of water-cooled-type batteries.

The present disclosure provides a rear structure for vehicles, which may include structures configured to effectively distribute collision energy applied to a rear floor so that a fuel tank is disposed close to the rear end of a vehicle. Also, a single high-voltage battery is employed to be water-cooled, thereby improving the performance of the battery.

Hereinafter, reference will be made in detail to various forms of the present disclosure, examples of which are illustrated in the accompanying drawings and described below.

Figure 2:
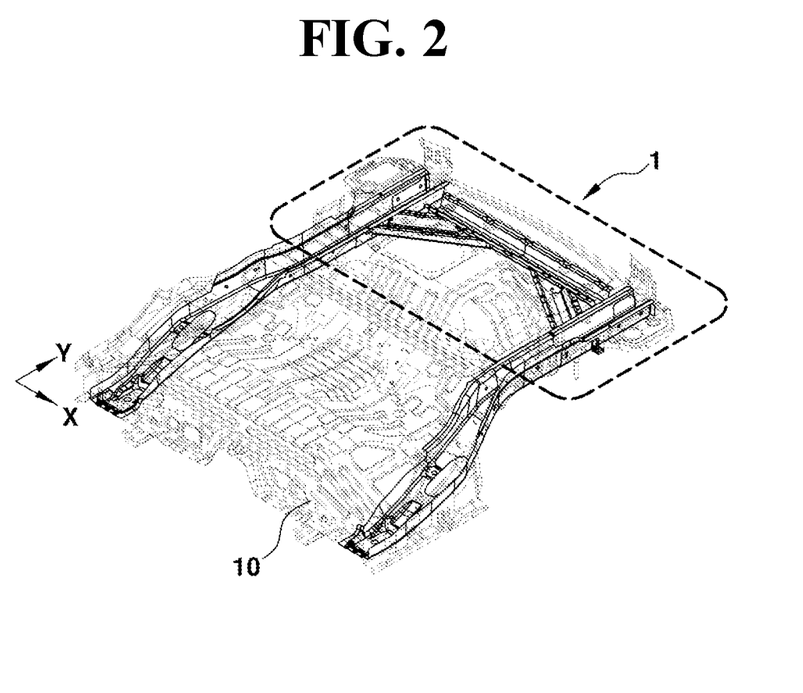
FIG. 2 is a top view of a rear floor including a rear structure for vehicles according to one form of the present disclosure.
Figure 3:
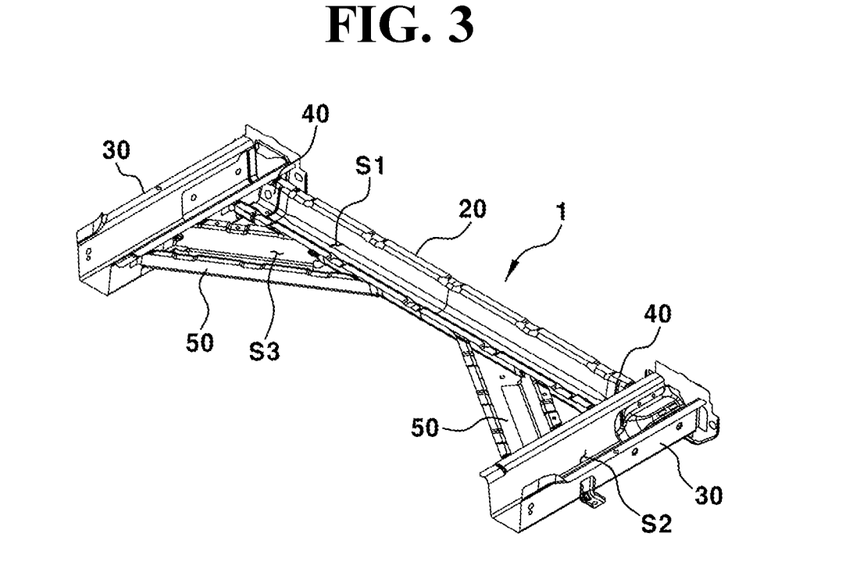
FIG. 3 is a perspective view illustrating a portion of the rear structure for vehicles according to the present disclosure, indicated by a dotted line of FIG. 2, from which the rear floor is removed.
Figure 4:
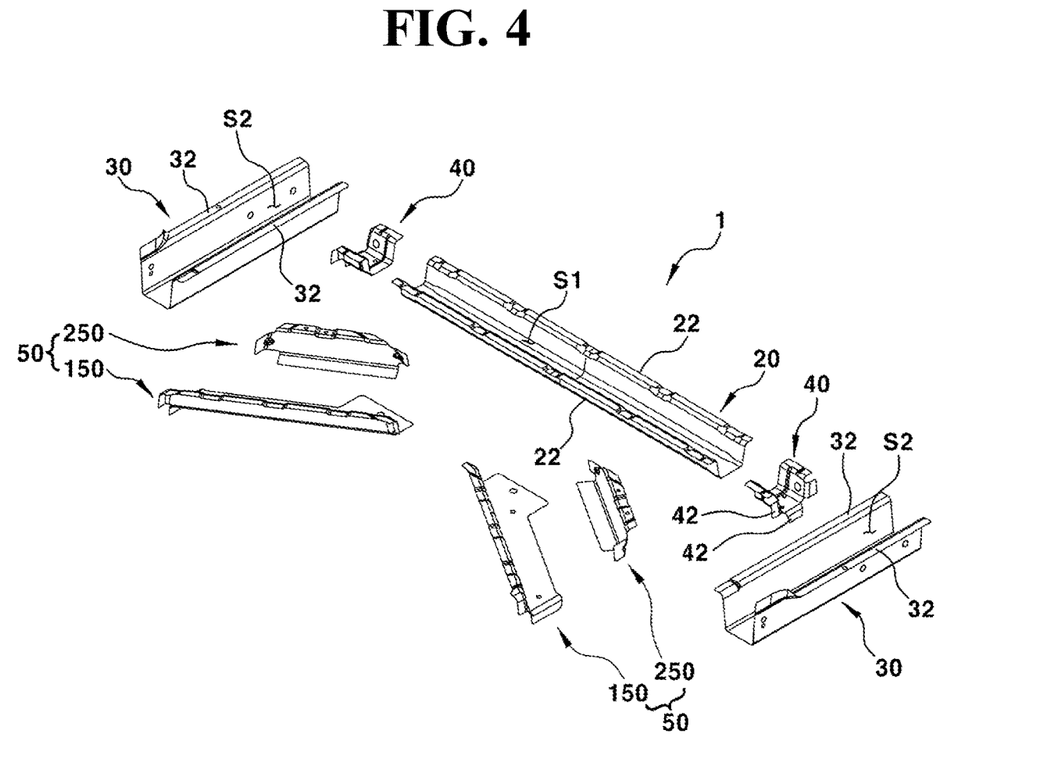
FIG. 4 is an exploded perspective view of FIG. 3.

FIG. 2 is a top view of a rear floor including a rear structure for vehicles according to one form of the present disclosure, FIG. 3 is a perspective view illustrating a portion of the rear structure for vehicles according to one form of the present disclosure, indicated by a dotted line of FIG. 2, from which the rear floor is removed, and FIG. 4 is an exploded perspective view of FIG. 3. Hereinafter, the X-direction indicates the lateral direction of a vehicle, and the Y-direction indicates the longitudinal direction of the vehicle.

As shown in FIGS. 2 to 4, a rear structure 1 for vehicles according to one form of the present disclosure is provided on a rear floor 10 of a vehicle. The structure 1 may include a cross member 20, side extensions 30, coupling elements 40 and oblique members 50. Particularly, the cross member 20, the side extensions 30, the coupling elements 40 and the oblique members 50 are coupled to the lower surface of the rear floor 10.

The cross member 20 is coupled to the lower surface of the rear floor 10 and extends in the lateral direction (the X-direction) of the vehicle.

The cross member 20 is coupled to the lower surface of the rear floor 10 to define a first space S1, which is a vacant space, together with the rear floor 10. For example, the first space S1 may have a substantially rectangular cross-section.

According to one form of the present disclosure, the cross member 20 includes end flanges 22 configured to be bent from both sides of the cross member 20. The end flanges 22 are formed to be bent from both sides of the cross member 20 in the longitudinal direction of the cross member 20. The end flanges 22 are configured to have a profile corresponding to the rear floor 10 to be attached to the lower surface of the rear floor 10.

The side extensions 30 are respectively coupled to both ends of the cross member 20. The side extensions 30 are coupled to both sides of the lower surface of the rear floor 10. The side extensions 30 extend to a designated distance in the longitudinal direction (the Y-direction) of the vehicle along both side surfaces of the rear floor 10.

The side extensions 30 are coupled to the lower surface of the rear floor 10, thereby forming respective second spaces S2, which are vacant spaces, together with the rear floor 10.

According to one form of the present disclosure, each of the side extensions 30 includes side flanges 32. The side flanges 32 are formed to be bent from both sides of the side extension 30, and are attached to the lower surface of the rear floor 10.

According to one form of the present disclosure, the side extensions 30 are coupled to the cross member 20 by the coupling elements 40. The coupling elements 40 are provided at both ends of the cross member 20. The coupling elements 40 may provide additional reinforcement to the ends of the cross member 20 and facilitate the coupling with the cross member 20.

The coupling members 40 are configured to have the same cross-sectional shape as that of the cross member 20 and are positioned inside the cross member 20. Flange elements 42, which are bent from the circumference of each of the coupling members 40, are provided at one side end of each of the coupling members 40. The flange elements 42 are coupled to the outer surface of the side extension 30, and the coupling elements 40 reinforce and facilitate coupling between the cross member 20 and the side extension 30.

A pair of the oblique members 50 is provided at each of both sides of the rear floor 10 to extend from the cross member 20 to the side extensions 30. The oblique members 50 are coupled to the lower surface of the rear floor 10, and are disposed diagonally, i.e., obliquely, to the longitudinal direction (the Y-direction) or the lateral direction (the X-direction) of the vehicle on the lower surface of the rear floor 10. One side of each of the respective oblique members 50 is coupled to the cross member, and the other side of each of the respective oblique members 50 extends to a corresponding one of the side surfaces of the rear floor 10, and more particularly, is coupled to a corresponding one of the side extensions 30.

Figure 5:
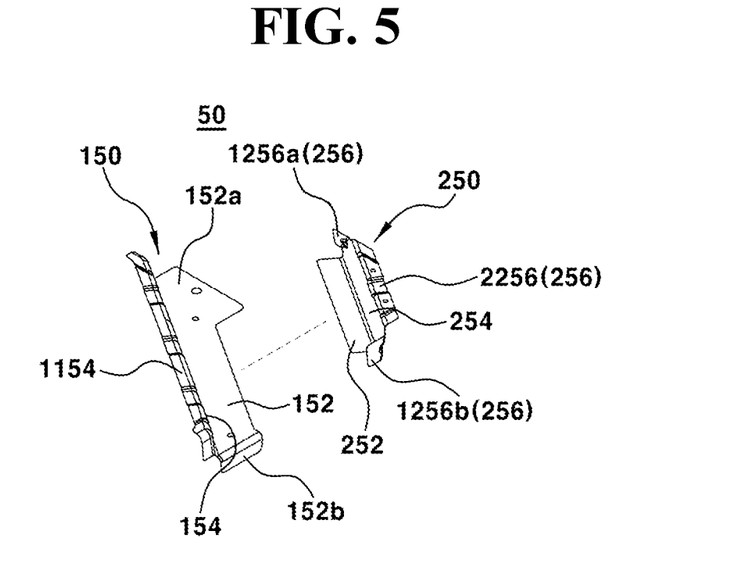
FIG. 5 is a view illustrating oblique members according to one form of the present disclosure.

Referring to FIG. 5, according to one form of the present disclosure, each of the oblique members 50 include a first member 150 and a second member 250. The first member 150 and the second member 250 form a third space S3, one side of which is open, therebetween. The third space S3 having the open side is coupled to the lower surface of the rear floor 10, thereby being closed.

The first member 150 has an L-shaped cross-section. The first member 150 includes a first part 152 and a second part 154. The first part 152 is formed substantially parallel to the rear floor 10 or is formed in the horizontal direction, and the second part 154 is bent substantially orthogonally from the first part 152.

A proximal end 152a of the first part 152 is coupled to the lower surface of the cross member 20. The proximal end 152a of the first part 152 changes the direction thereof from the oblique direction and then extends in parallel to the longitudinal direction (the Y-direction) of the vehicle to facilitate coupling to the cross member 20. Therefore, the proximal end 152a of the first part 152 has an expanded area compared to other portions of the first part 152 and thus improves the force of coupling to the cross member 20. Here, a proximal end is defined as one end of an element which is closer to the cross member 20, and a distal end is defined as the other end of the element which is farther from the cross member 20.

A distal end 152b of the first part 152 may be bent downwards or towards the ground from the first part 152. The distal end 152b of the first part 152 has substantially the same profile as the outer surface of the side extension 30, thereby facilitating coupling to the side extension 30.

The second part 154 extends substantially orthogonally from the first part 152, and includes a coupling flange 1154 coupled to the rear floor 10. The coupling flange 1154 is bent from the second part 154 and is attached to the lower surface of the rear floor 10.

The second member 250 is coupled to the first member 150. According to one form of the present disclosure, the second member 250 includes a bonding part 252, a vertical part 154, and connection flanges 256.

The bonding part 252 is directly bonded to the first part 152 of the first member 150. According to one form of the present disclosure, the lower surface of the bonding part 252 may be bonded to the upper surface of the first part 152. According to another form of the present disclosure, the upper surface of the bonding part 252 may be bonded to the lower surface of the first part 152.

The vertical part 254 is bent from the bonding part 252 and extends substantially in the vertical direction. Therefore, the vertical part 254 and the second part 154 face each other due to coupling of the first member 150 and the second member 250.

The connection flanges 256 are formed to be bent from the circumference of the vertical part 254. The connection flange 256 may include a pair of side connection flanges 1256a, 1256b and an upper connection flange 2256. The side connection flanges 1256a, 1256b formed at both sides of the vertical part 254 are bent obliquely from the vertical part 154 and extend substantially in parallel to the outer surface of the cross member 20 and the outer surface of the side extension 30. The upper connection flange 2256 formed on the upper portion of the vertical part 254 is bent from the vertical part 254 and is attached to the rear floor 10. For example, the upper connection flange 2256 may have the same configuration as the coupling flange 1154.

Although the first member 150 and the second member 250 are provided as separate members in the above description, the first member 150 and the second member 250 may be integrated into a single body.

Figure 6A:
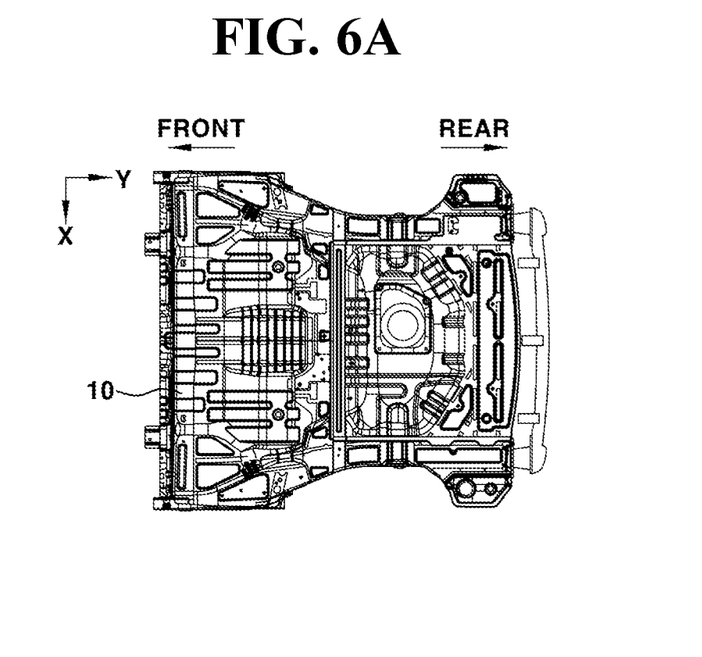
FIG. 6A is a top view of the rear floor including the rear structure for vehicles according to one form of the present disclosure.
Figure 6B:
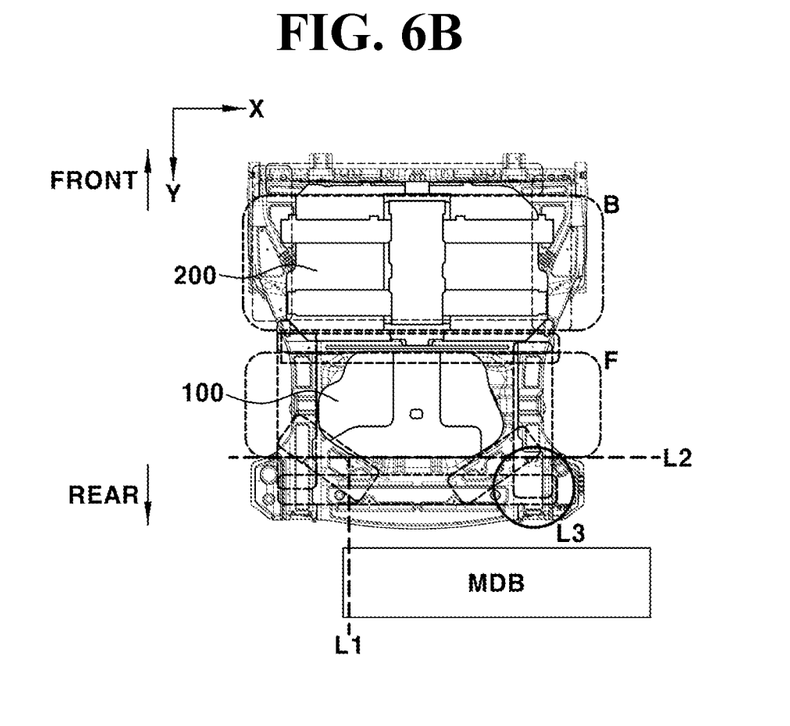
FIG. 6B is a bottom view of the rear floor including the rear structure for vehicles according to one form of the present disclosure.

FIG. 6A is a top view of the rear floor including the rear structure for vehicles according to one form of the present disclosure, and FIG. 6B is a bottom view of the rear floor including the rear structure for vehicles according to one form of the present disclosure.

The body of a vehicle provides ability to withstand a rear collision by connecting load paths. Although members for withstanding rear collisions are provided at both sides, i.e., the left and right sides, of the vehicle, these members may not fully perform their functions if a load is concentrated on one side of the vehicle. When the load is transmitted along only the load path provided in one direction, the load is concentrated on one portion of the vehicle, collision energy is not properly absorbed, and thus, local deformation increases.

According to the present disclosure, the structure serving to distribute the force of the back beam of a bumper, particularly, the oblique members 50 configured to support the cross member 20 are employed, thereby inhibiting the back beam from fracturing and the cross member 20 from being pushed out, and effectively distributing the collision force to both sides of the vehicle. Further, according to the present disclosure, the behavior of the respective members may be maintained constant even after a collision.

In FIG. 6B, B indicates a protection section for a battery 200, and F indicates a protection section for a fuel tank 100. According to the present disclosure, when a moving deformable barrier (MDB), which is offset to the left in the lateral direction (the X-direction) of the vehicle by 70%, as indicated by L1, crashes into the vehicle, the protection section F for the fuel tank 100 coincides with a line L2 formed by the ends of the oblique members 50. This position corresponds to the maximum position at which the fuel tank 100 is protectable. Further, a maximized buckling induction section L3 may be provided at each of both sides of the vehicle so as to stably absorb impacts.

That is to say, the rear structure for vehicles according to the present disclosure exhibits excellent collision force distribution in the event of a rear collision, particularly an offset collision.

Figure 7A:
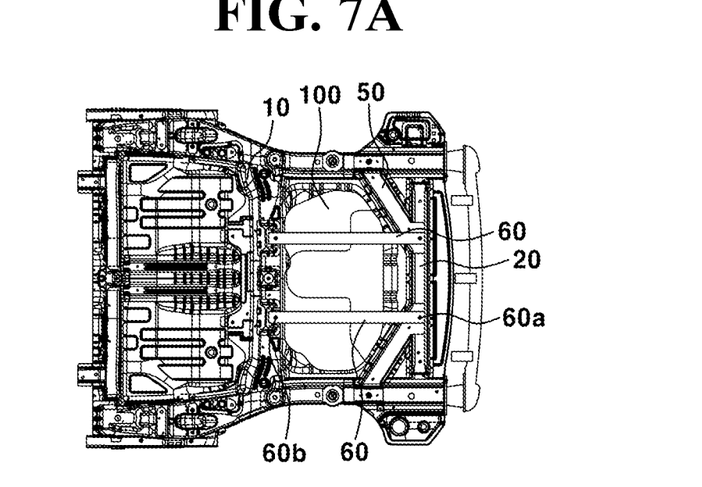
FIG. 7A is a bottom view of the rear floor including the rear structure for vehicles according to one form of the present disclosure.
Figure 7B:
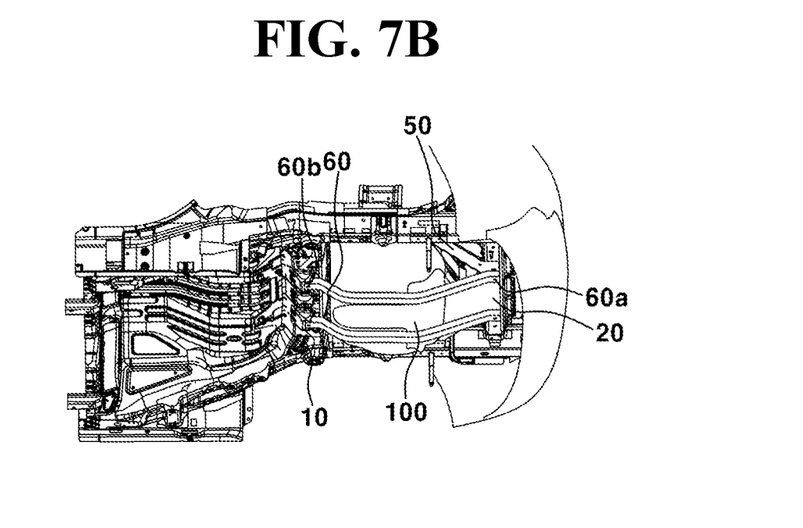
FIG. 7B is a bottom perspective view of the rear floor including the rear structure for vehicles according to one form of the present disclosure.

As shown in FIGS. 7A and 7B, according to one form of the present disclosure, reinforcement members 60 may be provided on the lower surface of the rear floor 10. A proximal end 60a of each of the reinforcement members 60 may be coupled to the cross member 20 or the oblique member 50. A distal end 60b of each of the reinforcement members 60 may be coupled to the lower surface of the rear floor 10.

Figure 8A:
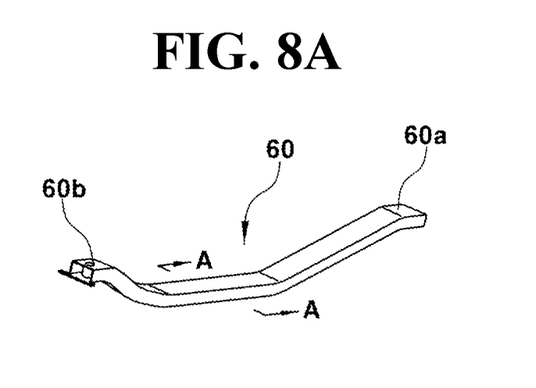
FIG. 8A is a perspective view of a reinforcement member according to one form of the present disclosure.
Figure 8B:
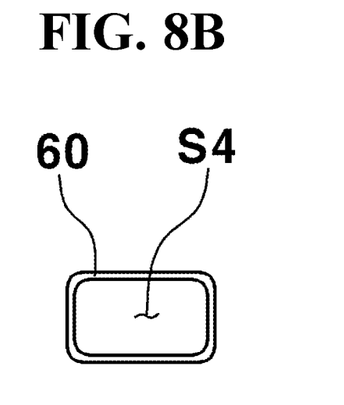
FIG. 8B is a cross-sectional view taken along line A-A of FIG. 8A.

As shown in FIGS. 8A and 8B, according to one form of the present disclosure, the reinforcement member 60 includes a fourth space S4, which is a vacant space, formed therein.

As described above, since the allowable deformation of the fuel tank of a plug-in hybrid electric vehicle (PHEV) is very low, it is desired to additionally protect the fuel tank 100. Therefore, in the present disclosure, one or more reinforcement members 60 are configured to support the fuel tank 100. In particular, the reinforcement members 60 has the fourth space S4 inside. At least for these reasons, deformation of the fuel tank 100 can be effectively inhibited when a collision occurs.

As is apparent from the above description, the present disclosure provides a rear structure for vehicles, which may effectively distribute collision energy in the event of a rear collision.

Further, the rear structure for vehicles according to the present disclosure may effectively protect a battery and a fuel in the event of a rear collision.

The disclosure has been described in detail with reference to preferred forms thereof. However, it will be appreciated by those skilled in the art that changes may be made in these forms without departing from the principles and spirit of the present disclosure.

What is claimed is:

1. A rear structure for vehicles, the rear structure comprising:
    a rear floor; and
    a pair of oblique members coupled to a lower surface of the rear floor and configured to be symmetrical with each other about a longitudinal centerline of the rear floor, each oblique member of the pair of oblique members extending from a first side and a second side, respectively, of the rear floor to a rear portion of the rear floor.

2. The rear structure for vehicles of claim 1, wherein the pair of oblique members extends from the first and second sides of the rear floor to the rear portion of the rear floor towards each other.

3. The rear structure for vehicles of claim 1, wherein the pair of oblique members and the lower surface of the rear floor form third spaces.

4. The rear structure of claim 1, further comprising at least one reinforcement member including:
    a first side coupled to a first oblique member of the pair of oblique members at the rear portion of the rear floor; and
    a second side coupled to the lower surface of the rear floor.

5. The rear structure of claim 4, wherein the at least one reinforcement member comprises a fourth space, which is vacant, formed therein.

6. The rear structure of claim 1, wherein each of the pair of oblique members comprises a first member and a second member coupled to the first member.

7. The rear structure of claim 1, further comprising:
    a pair of side extensions respectively coupled to a first side an d a second side of the lower surface of the rear floor and configured to extend in a longitudinal direction of the rear floor; and
    a cross member provided on a rear portion of the lower surface of the rear floor and configured to connect the pair of side extensions.

8. The rear structure of claim 7, wherein each side extension of the pair of side extensions is coupled to a first side of each oblique member, respectively, and the cross member is coupled to a second side of the each oblique members.

9. The rear structure of claim 7, further comprising a pair of coupling elements coupled to a first side and a second side of the cross member, respectively, and configured to couple the cross member to the pair of side extensions.

10. The rear structure of claim 9, wherein each coupling element of the pair of coupling elements includes a flange element configured to be bent from the coupling element and to be bonded to the side extension.

11. The rear structure of claim 7, wherein the cross member and the pair of oblique members are flange-coupled to the rear floor and forms a first space.

* * * * *